US012637115B2

(12) United States Patent
Maguire

(10) Patent No.: US 12,637,115 B2
(45) Date of Patent: May 26, 2026

(54) RAILBIKES WITH REVERSIBLE DIRECTION OF TRAVEL

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 738 days.

(21) Appl. No.: 17/941,076

(22) Filed: Sep. 9, 2022

(65) Prior Publication Data

US 2024/0083469 A1    Mar. 14, 2024

(51) Int. Cl.
| | |
|---|---|
| *B61D 33/00* | (2006.01) |
| *B61D 15/00* | (2006.01) |
| *B62K 7/02* | (2006.01) |
| *B62K 17/00* | (2006.01) |
| *B62M 1/36* | (2013.01) |

(52) U.S. Cl.
CPC ......... *B61D 15/00* (2013.01); *B61D 33/0064* (2013.01); *B62K 7/02* (2013.01); *B62K 17/00* (2013.01); *B62M 1/36* (2013.01)

(58) Field of Classification Search
CPC .............. B62K 2003/125; B62K 17/00; B61D 33/0085; B61D 15/00
See application file for complete search history.

(56) References Cited

U.S. PATENT DOCUMENTS

| | | | | |
|---|---|---|---|---|
| 627,876 A | * | 6/1899 | Price | F16D 41/12 |
| | | | | 192/46 |
| 3,249,073 A | * | 5/1966 | Gorham | A47B 57/045 |
| | | | | 108/134 |
| 3,394,964 A | * | 7/1968 | Humphries | B61D 33/0085 |
| | | | | 297/344.22 |
| 3,708,203 A | * | 1/1973 | Barecki et al. | B61D 33/0085 |
| | | | | 248/416 |
| 4,178,008 A | * | 12/1979 | Barrett | B62K 3/00 |
| | | | | 280/209 |
| 6,012,732 A | * | 1/2000 | Potter | B62M 1/24 |
| | | | | 280/282 |

(Continued)

FOREIGN PATENT DOCUMENTS

| | | | | |
|---|---|---|---|---|
| CN | 105667526 A | * | 6/2016 | |
| CN | 111003004 A | * | 4/2020 | B61D 15/00 |

(Continued)

OTHER PUBLICATIONS

DE 202022001235 U1 machine translation from FIT (Year: 2025).*

*Primary Examiner* — S. Joseph Morano
*Assistant Examiner* — Maxwell L Meshaka
(74) *Attorney, Agent, or Firm* — Fox Rothschild LLP

(57)     ABSTRACT

Railbikes configured to transport passengers on a railway are provided. The railbikes are propelled by the passengers, using foot pedals. The railbikes are equipped with passenger seats whose orientation can be reversed quickly and easily the passengers. Also, the railbikes includes reversible clutches that permit the passengers to pedal in opposite directions, depending on the desired direction of travel of the railbikes. Thus, the direction of travel of the railbikes can be reversed without a need to lift the railbikes off of the underlying rails to physically reorient the railbikes in the opposite direction; and without a need for a turntable or other specialized railway equipment to turn the railbike.

16 Claims, 7 Drawing Sheets

(56) References Cited

U.S. PATENT DOCUMENTS

| | | | | |
|---|---|---|---|---|
| 6,210,300 B1 * | 4/2001 | Costin | .................... | F16H 3/66 |
| | | | | 475/297 |
| 6,485,042 B1 * | 11/2002 | Herman | ................ | B62K 9/00 |
| | | | | 280/236 |
| 6,742,841 B1 * | 6/2004 | Soditch | ............... | B60N 2/309 |
| | | | | 297/335 |
| D590,747 S * | 4/2009 | Staller | ........................ | D12/107 |
| 7,861,658 B2 * | 1/2011 | Lee | ...................... | A63G 25/00 |
| | | | | 280/282 |
| 9,592,838 B1 * | 3/2017 | Mecklenburg | ........... | B62H 1/12 |
| 12,005,936 B2 * | 6/2024 | Hart | ..................... | B61D 15/10 |
| 2006/0151224 A1 * | 7/2006 | Vasser | .................... | B62K 5/02 |
| | | | | 180/206.7 |
| 2009/0038502 A1 * | 2/2009 | Lee | ...................... | A63G 25/00 |
| | | | | 105/91 |
| 2012/0241239 A1 * | 9/2012 | Holroyd | ................. | B62K 7/02 |
| | | | | 180/210 |
| 2024/0083469 A1 * | 3/2024 | Maguire | ................ | B62M 1/36 |

FOREIGN PATENT DOCUMENTS

| | | | | | | |
|---|---|---|---|---|---|---|
| CN | 113503925 A | * | 10/2021 | | ............ | B61D 15/00 |
| CN | 117382686 A | * | 1/2024 | | ........ | B61D 33/0007 |
| CN | 117400978 A | * | 1/2024 | | ............ | B61D 15/00 |
| CN | 117416378 A | * | 1/2024 | | | |
| DE | 202022001235 U1 | * | 7/2022 | | | |
| KR | 20090082165 A | * | 7/2009 | | | |
| KR | 20100005853 U | * | 6/2010 | | | |
| KR | 20200053206 A | * | 5/2020 | | | |
| KR | 20250010478 A | * | 1/2025 | | | |
| WO | WO-2007049314 A1 | * | 5/2007 | | ............ | B60F 1/005 |

* cited by examiner

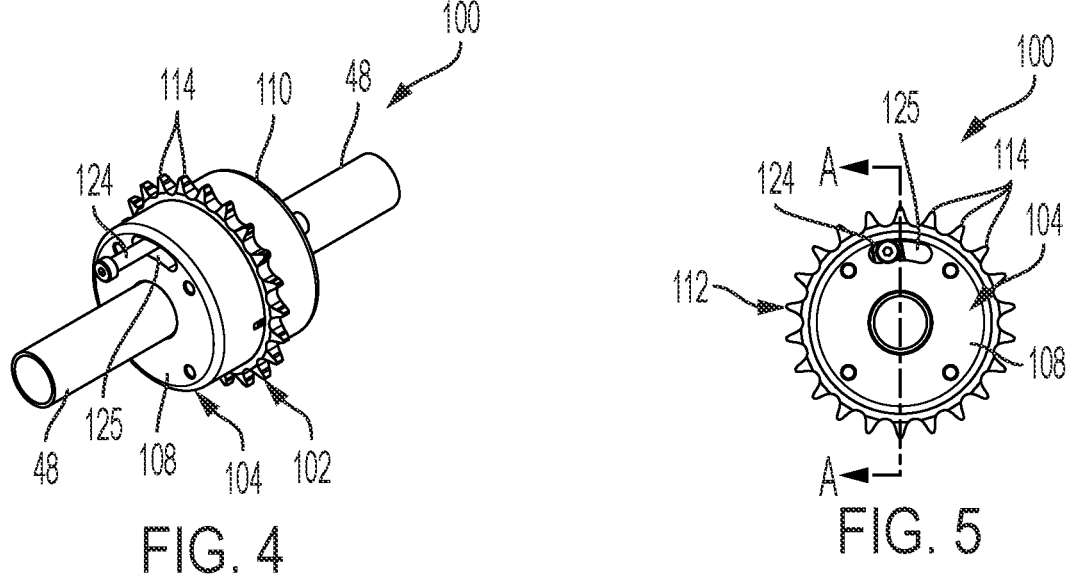
FIG. 4
FIG. 5
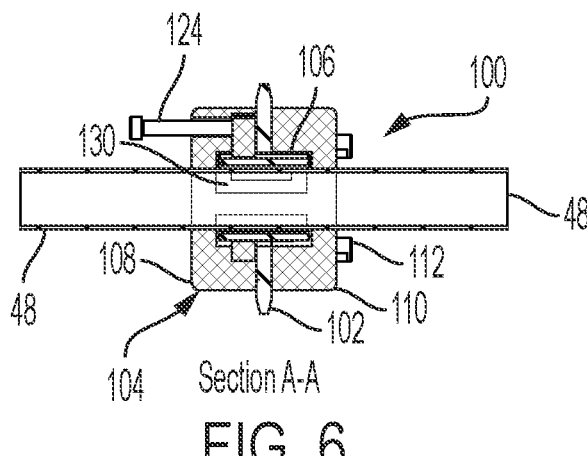
Section A-A
FIG. 6

RAILBIKES WITH REVERSIBLE
DIRECTION OF TRAVEL

BACKGROUND

Railbikes are small vehicles used for transporting one or more people on railways or track systems. Railbikes are gaining popularity for used in recreational activities such as touring, sightseeing, exercise, etc. A railbike typically is powered by its passengers, using foot pedals through which the passengers can provide a torque input to drive one or more wheels of the railbike.

A railbike usually is configured to travel in one direction only. Thus, reversing the direction of travel may require lifting the railbike from the underlying rails, turning the railbike by 180 degrees, and then placing the railbike back on the railway in its reversed orientation. A typical railbike is relatively heavy, weighing up to several hundred pounds. Thus, it can be difficult, if not impossible, for the passengers to change the direction of travel by lifting and reorienting the railbike.

Alternatively, a railbike may be reoriented to travel in an opposite direction using a turntable, a hoist, or other specialized equipment. Such equipment, even if available, is generally installed at fixed locations, and may not be available at the specific location where the passengers wish to reverse their direction of travel. Thus, railbike passengers typically do not have any feasible options for reversing their direction of travel without the use of specialized equipment available only at specific, limited locations along the railway.

SUMMARY

In one aspect of the disclosed technology, railbike configured for movement on a railway includes a frame; and a plurality of wheels coupled to the frame, the wheels being configured to rotate in relation to the frame, and to engage the railway. The railbike also includes a driveshaft mounted on the frame and configured to rotate in relation to the frame, the driveshaft being connected to at least one of the wheels; and a seat mounted on the frame and configured to provide a seating area for a passenger. The railbike also includes a pedal assembly mounted on the frame, the pedal assembly being configured to rotate in relation to the frame, and to transmit a torque applied to the pedal assembly by the passenger; and a clutch coupled to the pedal assembly and configured to transmit to the driveshaft at least a portion of the torque applied to the pedal assembly. The clutch is selectively configurable to transmit the portion of the applied torque to the driveshaft in a first angular direction, and in a second angular direction opposite the first angular direction.

In another aspect of the disclosed technology, the seat is configured to be mounted on the frame in a first orientation, and a second orientation.

In another aspect of the disclosed technology, the railbike further incudes a first and a second rail mounted on the frame. The seat includes a first bracket configured to engage the first rail when the seat is in the first orientation, and a second bracket configured to engage the second rail when the seat is in the first orientation.

In another aspect of the disclosed technology, the first bracket is configured to engage the second rail when the seat is in the second orientation, and a second bracket is configured to engage the first rail when the seat is in the second orientation.

In another aspect of the disclosed technology, the seat further includes a platform, and a backrest connected to the bottom platform; and the brackets are mounted on a lower surface of the platform.

In another aspect of the disclosed technology, the second orientation is angularly offset from the first orientation by about 180 degrees.

In another aspect of the disclosed technology, the seat is a first seat, and the railbike further includes a second, a third, and a fourth seat. The pedal assembly is a first pedal assembly, and the railbike further incudes a second, a third, and a fourth pedal assembly. The clutch is a first clutch, and the railbike further includes a second, a third, and a fourth clutch.

In another aspect of the disclosed technology, the pedal assembly includes a sprocket, and two pedals connected to the sprocket.

In another aspect of the disclosed technology, the railbike further includes a chain coupled to the sprocket and the clutch, the chain being configured to transmit the at least a portion of the applied torque to the clutch.

In another aspect of the disclosed technology, the clutch includes a sprocket coupled to the pedal assembly, and at least one pin. The pin is configured to engage an inner circumferential surface of the sprocket and an outer surface of the driveshaft so that the at least a portion of the applied torque is transmitted from the sprocket and to the driveshaft via the pin.

In another aspect of the disclosed technology, the inner circumferential surface of the sprocket includes a first camming portion; and the pin is configured to engage the first camming portion so that the at least a portion of the applied torque is transmitted from the first camming portion and to the driveshaft via the pin, in the first angular direction.

In another aspect of the disclosed technology, the inner circumferential surface of the sprocket further includes a second camming portion; and the pin is further configured to engage the second camming portion so that the at least a portion of the applied torque is transmitted from the second camming portion and to the driveshaft via the pin, in the second angular direction.

In another aspect of the disclosed technology, the clutch further incudes a cage mounted on the driveshaft and configured to rotate in relation to the driveshaft; and the cage has at least one recess formed therein and configured to receive the pin.

In another aspect of the disclosed technology, the cage is configured to move between a first position at which the pin contacts the first camming portion, and a second position at which the pin contacts the second camming portion.

In another aspect of the disclosed technology, the driveshaft is configured to rotate in the second angular direction in relation to the pin and the sprocket when the cage is in the first position; and the driveshaft is further configured to rotate in the first angular direction in relation to the pin and the sprocket when the cage is in the second position.

In another aspect of the disclosed technology, the clutch further includes a spring disposed within a bore formed in the cage, and a set screw coupled to the hub and configured to retain the spring in the bore. The spring is configured to bias the cage toward the first position cage when the cage is in the first position; and the spring is further configured to bias the cage toward the second position when the cage is in the second position.

In another aspect of the disclosed technology, the pin is further configured to transmit the at least a portion of the applied torque from the sprocket and to the driveshaft via frictional contact between the pin, the sprocket, and the driveshaft.

In another aspect of the disclosed technology, the first camming portion includes a curved surface that extends radially inward, toward an axis of rotation of the driveshaft.

In another aspect of the disclosed technology, the clutch further incudes a hub having a first half and a second half; the sprocket is positioned between the first and second halves; the hub and the sprocket define a cavity; and the cage and the pin are positioned within the cavity.

In another aspect of the disclosed technology, the pin is a first pin, and the clutch further incudes a second, a third, a fourth, a fifth, and a sixth pin. The inner circumferential surface of the sprocket further incudes a third, a fourth, a fifth, and a sixth camming portion.

DESCRIPTION OF THE DRAWINGS

The following drawings are illustrative of particular embodiments of the present disclosure and do not limit the scope of the present disclosure. The drawings are not to scale and are intended for use in conjunction with the explanations provided herein. Embodiments of the present disclosure will hereinafter be described in conjunction with the appended drawings.

FIG. 4 is a perspective view of a clutch and driveshaft of the railbike shown in FIGS. 1-3.

FIG. 5 is a side view of the clutch and driveshaft shown in FIG. 4.

FIG. 6 is a cross-sectional view of the clutch and drive-shaft shown in FIGS. 4 and 5, taken through the line A-A of FIG. 5.

DETAILED DESCRIPTION

Figure 1:
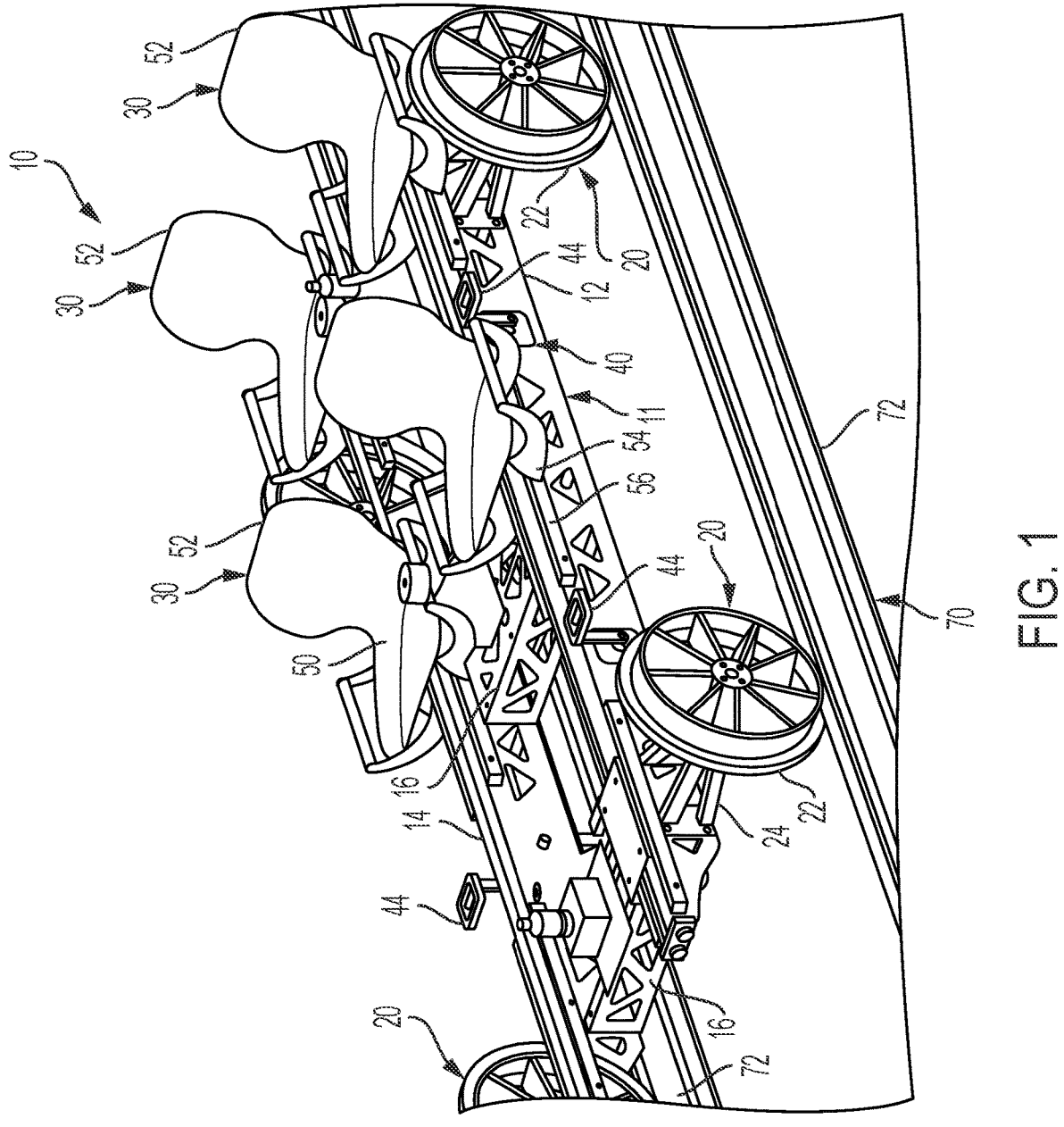
FIG. 1 is a top-front perspective view of a railbike, configured for travel in a first direction.

The inventive concepts are described with reference to the attached figures, wherein like reference numerals represent like parts and assemblies throughout the several views. The figures are not drawn to scale and are provided merely to illustrate the instant inventive concepts. The figures do not limit the scope of the present disclosure or the appended claims. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts.

The figures disclose a railbike 10. The railbike 10 is configured to transport up to four passengers on a railway 70, i.e., a track system, with the motive force being provided by the passengers via foot pedals 44 on the railbike 10. The direction of travel of the railbike 10 can be reversed, without a need to lift the railbike 10 off the railway 70 and physically reorient the railbike 10 in the opposite direction, and without a need for a turntable, a hoist, or other specialized equipment. In particular, the railbike 10 is equipped with passenger seats 30 whose orientation can be reversed quickly and easily the passengers (or other operators) of the railbike 10. Also, the railbike 10 includes reversible clutches 100 that permit the passengers to pedal in opposite directions, depending on the desired direction of travel of the railbike 10. The clutches 100 also permit the foot pedals 44 to freewheel in the angular direction opposite the direction in which torque is being applied, so that the passengers do not need to pedal continuously while the railbike 10 is in motion.

The term "railbike," as used herein, is intended to encompass railway and track-borne vehicles propelled exclusively human power, as well as railway and track-borne vehicles propelled by humans and a supplemental power source such as an electric motor or an internal combustion engine.

Figure 2:
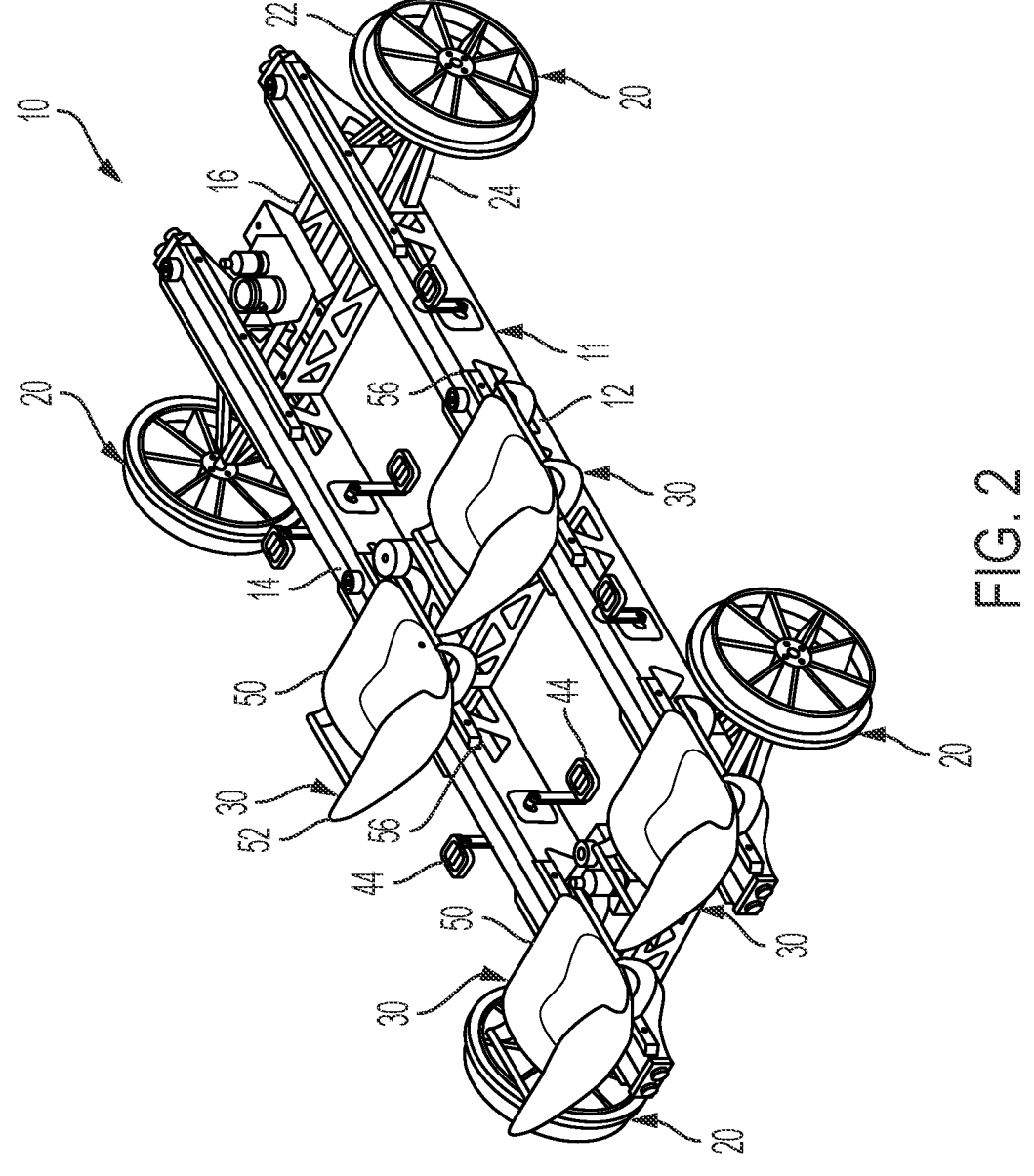
FIG. 2 is a perspective view of the railbike shown in FIG. 1, taken from the perspective of FIG. 1, showing the railbike configured for travel in a second direction opposite the first direction.
Figure 3:
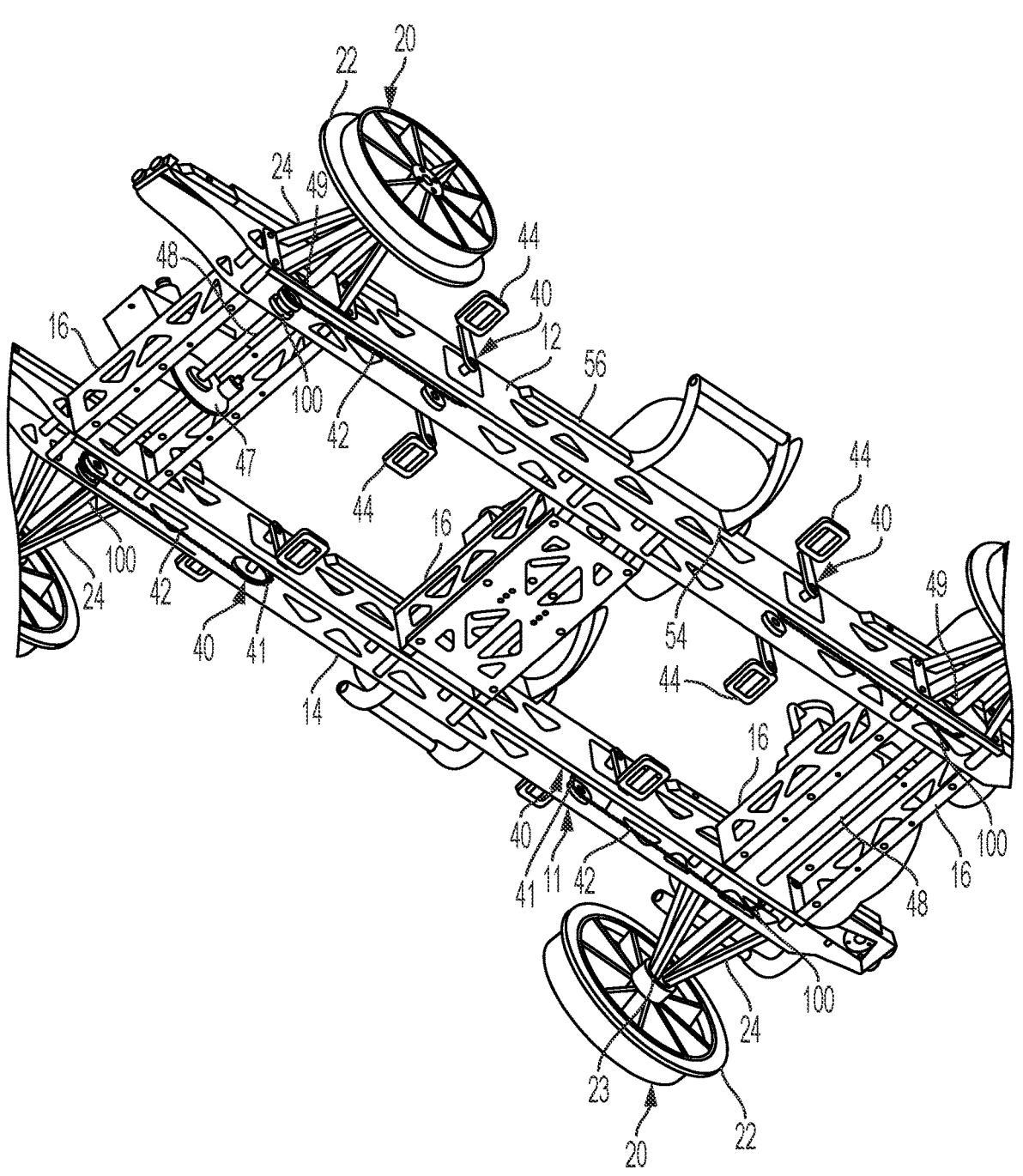
FIG. 3 is a bottom-front perspective view of the railbike shown in FIGS. 1 and 2, showing the railbike configured for travel in the first direction.

Referring to FIGS. 1-3, the railbike 10 incudes a frame 11 having a first side member 12, a second side member 14, and cross members 16 that extend transverse to, and connect the first and second side members 12, 14.

The railbike 10 also includes four wheels 20 each located proximate a respective corner of the railbike 10. Each wheel 20 incudes a flange 22 that defines, in part, an outer circumference of the wheel 20. The flange 22 is configured to engage a corresponding rail 72 of the railway 70 on which the railbike 10 is operated, to help maintain the railbike 10 on the railway. The rails 72 are visible in FIG. 1. Each wheel 20 is rotatably coupled to the frame via a respective bearing 23, visible in FIG. 3. Each bearing 23 is mounted for rotation on a respective mount 24 fixed to the first or second side member 12, 14.

The railbike 10 also includes four passenger seats 30. Alternative embodiments of the railbike 10 can include less, or more than four passenger seats 30. Each passenger seat 30 is mounted on the first side member 12 or the second side member 14, as shown in FIGS. 1 and 2. The passenger seat 30 includes a horizontally-oriented platform 50; and an upright backrest 52 that adjoins, or otherwise is connected to the platform 50. The platform 50 and the backrest 52 from the portion of the passenger seat 30 that accommodates the seated passenger.

Each passenger seat 30 is configured so that its orientation can be reversed easily and quickly by the user, to facilitate operation of the railbike 10 in opposite directions, with the passenger always facing the direction of travel. For example, the seat 30 can include two brackets 54 secured to the underside of the platform 50, proximate opposite sides of the platform 50. As can be seen in FIGS. 1 and 3, the brackets 54 are configured to engage corresponding rails 56 mounted on opposite sides of the first or second side members 12, 14, so that seat 30 straddles the associated first or second side member 12, 14. The brackets 54 can be secured to the corresponding rails 56 in a plurality of linear, i.e., front to back, positions selectable by the passenger, using pins (not shown) or other suitable means such as clamps, latches, etc.

The passenger can reverse the orientation of the passenger seat 30 by removing the pins, sliding the seat 30 forward or rearward to disengage the brackets 54 from the rails 56, and turning the seat 30 by 180 degrees. The reoriented seat 30 then is reinstalled on the rails 56, so that each bracket 54 engages the rail 56 opposite the rail 56 that it originally engaged. FIG. 1 shows the passenger seats 30 in a first orientation, suitable for travel in a first, or leftward direction. FIG. 2 shows the passenger seat 30 in a second orientation, suitable for travel in a second, or rightward direction.

The relatively light weight of the seats 30, in combination with the ability to easily and quickly remove, reorient, and re-install the seats 30, permit the passengers to re-configure the seating arrangement of the railbike 10 when the direction of travel of the railbike 10 is to be reversed, so that passengers face the direction of travel, and can pedal in a manner that results in movement of the railbike 10 in the desired direction. The feature, in combination with the reversible clutches 100 discussed below, permit the passengers to quickly and easily change the direction of travel of the railbike 10 at any location along the railway, without a need to lift the entire railbike 10 from the railway, and without a need for a turntable or other specialized equipment.

The above configuration of the passenger seats 30 is disclosed for illustrative purposes only. Other types of reversible passenger seats can be used in alternative embodiments. For example, the passenger seats can be configured with a backrest coupled to the platform in a manner that permits the backrest to move in relation to the platform, so that the seating orientation can be reversed by moving the backrest in relation to the platform.

The railbike 10 further comprises four pedal assemblies 40. Each pedal assembly 40 is rotatably coupled to the first or second side member 12, 14, and is located proximate a respective one of the seats 30. Each associated seat 30 and pedal assembly 40 make up a passenger station.

Referring to FIGS. 1-3, each pedal assembly 40 includes a sprocket 41 that engages a respective chain 42 associated with the pedal assembly 40. The pedal assembly 40 also includes two foot pedals 44 fixed to the sprocket 41. The foot pedals 44 allow the passenger to exert a torque on the sprocket 41.

The railbike 10 further includes four reversible clutches 100. AS can be seen in FIG. 3, each clutch 100 is associated with a corresponding pedal assembly 40 and chain 42, so that the torque exerted by the passenger on the pedal assembly 40 is transferred to the clutch 100 by the chain 42. In alternative embodiments, each pedal assembly 40 can be connected directly to its associated clutch 100, without the use of the chain 42.

The railbike 10 further comprises two driveshafts 48. As can be seen in FIGS. 4-7, each driveshaft 48 has a tubular configuration, with a smooth outer surface. The driveshafts 48 may have a diameter of, for example, about one inch. This dimension is provided for illustrative purposes only. The driveshafts 48 can have other diameters in alternative embodiments.

As can be seen in FIG. 3, a respective one of the wheels 20 is secured to each end of each driveshaft 48, so that the driveshaft 48 and its associated wheels 20 rotate together. Each driveshaft 48 is rotatably coupled to the frame 11 via the wheel bearings 23, and additional bearings 49 mounted on the first and second side members 12, 14. The bearings

49 are visible in FIG. 3. One of the driveshafts 48 may be equipped with a user-actuated brake 47, also visible in FIG. 3.

Each driveshaft 48 extends through two associated clutches 100. Each clutch 100 is associated with a respective one of the passenger stations. In particular, each clutch 100 engages an associated one of the chains 42, so that at least a portion of the torque exerted by the user on the associated pedal assembly 40 is transmitted the driveshaft 48 by way of the clutch 100. As discussed below, the clutches 100 are configured so that the user can select the direction in which torque is transmitted to the associated driveshaft 48. This feature permits the user to pedal in opposite directions, which in turn permits the user-generated torque to be applied to the driveshaft 48 in opposite directions, depending on the direction in which the railbike 10 is to be driven. Also, the clutch 100 is configured to freewheel in a rotational direction opposite the direction in which torque is being applied, so that the passenger does not need to pedal continually when the railbike 10 is in motion.

As noted above, the reversible clutches 100, in combination with the reversible passenger seats 30, permit the passengers to quickly and easily re-configure the railbike 10 to reverse the direction of travel of the railbike 10 at any location along the railway 70, without a need to lift the railbike 10 from the track, and without a need for specialized equipment.

Referring to FIGS. 4-9, the clutch 100 comprises a sprocket 102, a hub 104, and a clutch cage, or cage 106. The hub 104 has a first half 108, and a second half 110. The sprocket 102 is positioned between the first and second halves 108, 110. The first and second halves 108, 110 and the sprocket 102 are secured to each other by fasteners 112.

The sprocket 102 has a plurality of teeth 114 located around the outer circumference thereof. The teeth 114 are configured to engage the chain 42 associated with the clutch 100, so that at least a portion of the passenger-generated torque is transmitted to the clutch 100 via the sprocket 102.

Figure 7:
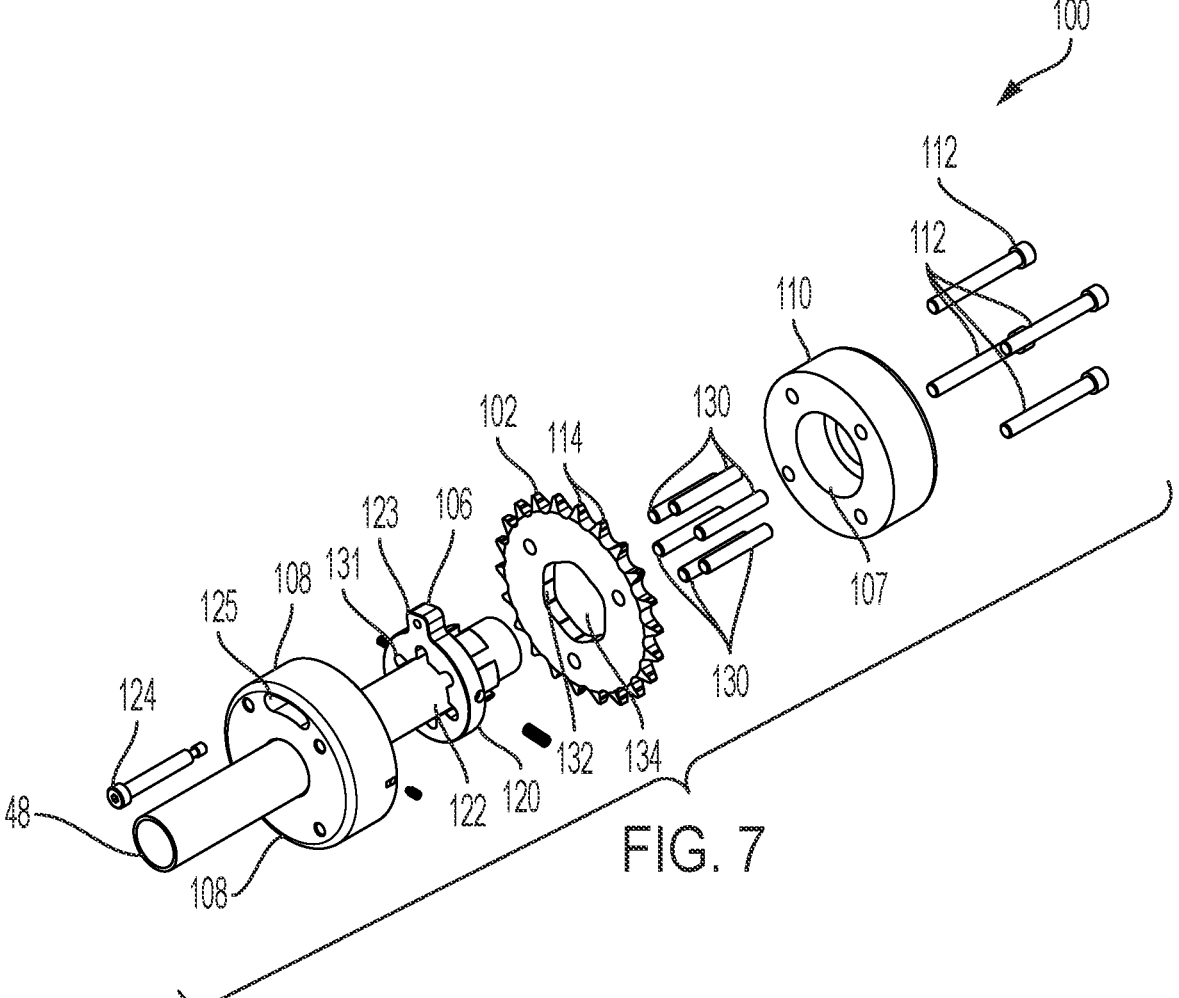
FIG. 7 is an exploded perspective view of the clutch and driveshaft shown in FIGS. 4-6.

As can be seen in FIGS. 6 and 7, the cage 106 is mounted on the associated driveshaft 48, and is disposed within an internal cavity 107 defined by the hub 104 and the sprocket 102. The cage 106 incudes a body 120. An inner circumference of the body 120 defines a central opening 122, visible in FIG. 7. The central opening 122 is sized to receive the driveshaft 48, with minimal clearance between the inner circumference of the body 120 and the outer circumference of the driveshaft 48.

The cage 106 further includes a tab 123 that adjoins an outer circumference of the body 120. A pin 124 is secured to the tab 123. The pin 124 extends through a curved slot 125 formed in the first half 108 of the hub 104, as depicted in FIGS. 4-6.

Figure 8:
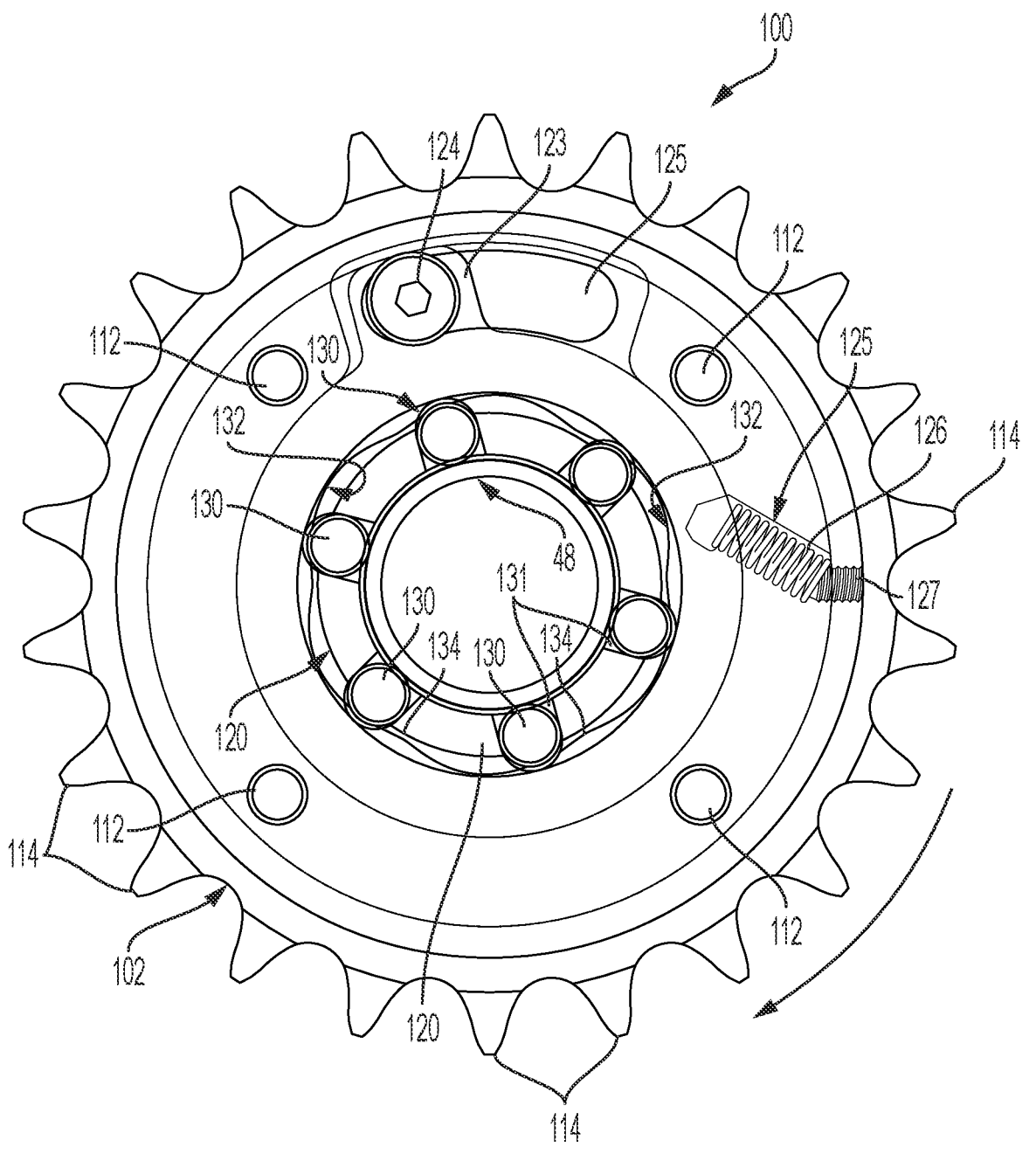
FIG. 8 is a side view of the clutch and driveshaft shown in FIGS. 4-7, with a hub of the clutch removed, and showing a cage of the clutch in a first position at which the clutch is configured to transmit torque to the driveshaft in a clockwise direction.
Figure 9:
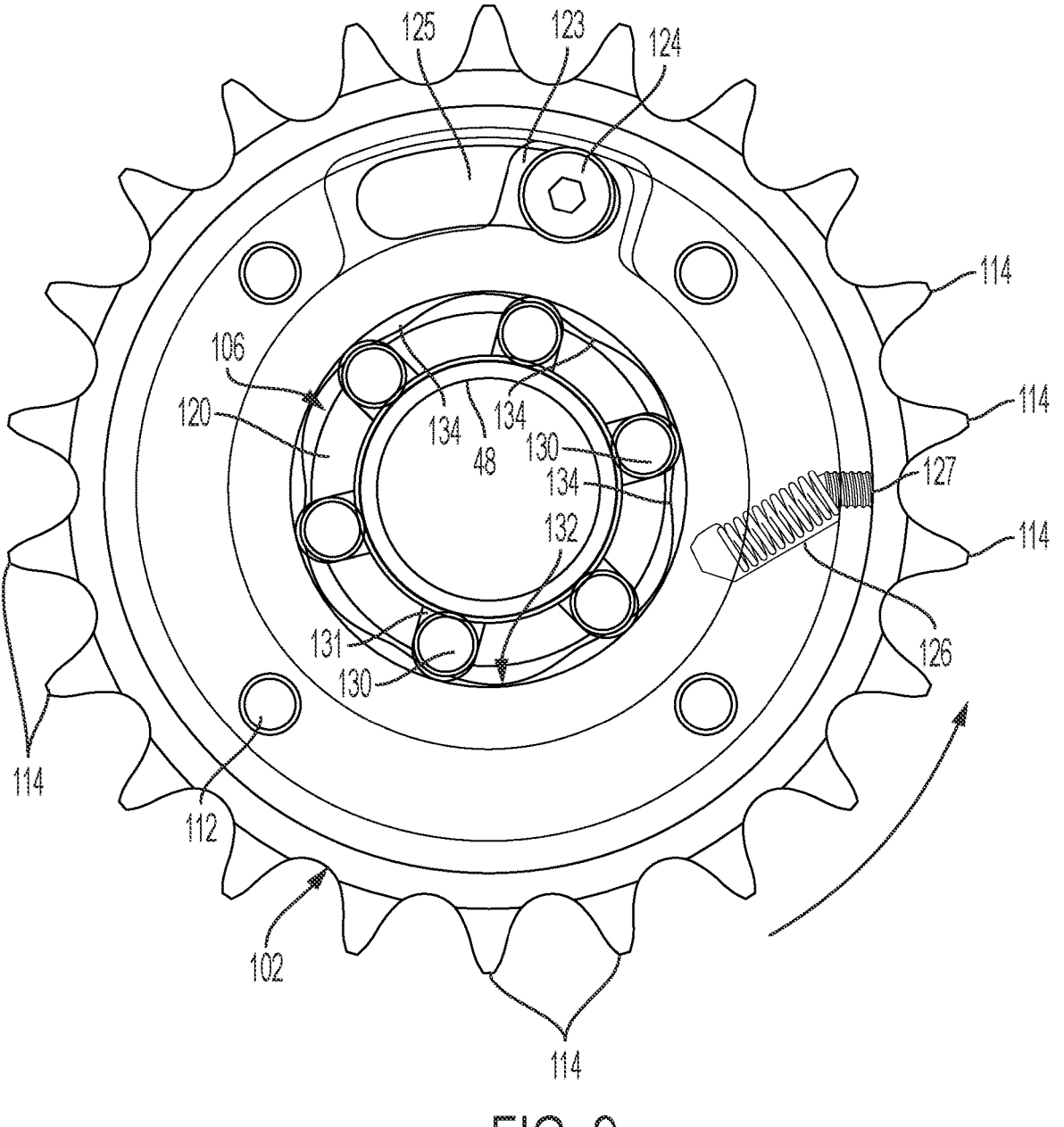
FIG. 9 is a side view of the clutch and driveshaft shown in FIGS. 4-8, with the hub of the clutch removed, and showing the cage of the clutch in a second position at which the clutch is configured to transmit torque to the driveshaft in a counterclockwise direction.

The cage 106 is configured to rotate in relation to the hub 104 and the sprocket 102, between a first position shown in in FIG. 8, and a second position shown in FIG. 9. As discussed below, the passenger (or other operator) of the railbike 10 can move the clutch cage 106 between its first and second positions when it is desired to change the direction in which torque is applied to the sprocket 102 by the chain 42, such as when the direction of travel of the railbike 10 is to be reversed. The passenger can move the cage 106 between its first and second positions by applying force to the pin 124.

The cage 106 is biased in its first and second positions by a spring 125, visible in FIGS. 7-9. The spring 125 is accommodated in a bore 126 formed in the body 120 of the cage 106. The spring 125 is retained in the bore 126 by a set screw 127 that engages an outer end of the spring 125, and the first half 108 of the hub 104.

Referring to FIG. 8, when the cage 106 is in its first position, the relative positions of the bore 126 and the set screw 127 orient the spring 125 a manner that causes the spring 125 to exert a bias on the clutch cage 106 in the counterclockwise direction. The counterclockwise bias urges the clutch cage 106 toward its first position.

As can be seen in FIG. 9, when the cage 106 is moved to the second position, the position of the bore 126 in relation to the set screw 127 orients the spring 125 a manner that causes the spring 125 to exert a bias on the clutch cage 106 in the clockwise direction. The clockwise bias urges the cage 106 toward its second position.

The clutch 100 further comprises a plurality of dowel pins, or pins 130, visible in FIGS. 6-9. Each dowel pin 130 has a cylindrical configuration, with a smooth outer surface. The dowel pins 130 may have a diameter of, for example, about 0.250 inch. This dimension is provided for illustrative purposes only. The dowel pins 130 can have other diameters in alternative embodiments.

The body 120 of the clutch cage 106 includes a plurality of recesses 131, as can be seen in FIGS. 7-9. The recesses 131 adjoin, and extend radially outward from the central opening 122. Each recess 131 is shaped and sized to receive an associated dowel pin 130 with minimal clearance between the outer circumference of the dowel pin 130 and the adjacent surface of the body 120. Alternative embodiments of the clutch 100 can incudes more, or less than six dowel pins 130.

The sprocket 102 has an inner circumferential surface 132 that defines a central opening 134 in the sprocket 102, as can be seen in FIG. 7. The surface 132 has a plurality of camming portions 134 that extend inward, toward the axial centerline of the clutch 100, as shown in FIGS. 8 and 9. Each camming portion 134 is symmetrically disposed about its midpoint, and has a curvilinear profile that causes the camming portion 134 to reach its maximum height, i.e., its maximum radially-inward extension, at its approximate mid-point.

The dowel pins 130 transmit torque from the sprocket 102, to the driveshaft 48. In particular, the sprocket 102, the dowel pins 130, and the driveshaft 48 are sized and shaped so that the diameter of the dowel pins 130 is greater than the gap between the mid-point of each camming portion 134, and the adjacent surface of the driveshaft 48, as can be seen in FIGS. 8 and 9. Thus, each dowel pin 130 becomes trapped or wedged between an associated camming portion 134 and the outer circumference of the driveshaft 48, as the sprocket 102 is rotatably driven by the torque exerted on the sprocket 102 by its associated chain 42. The resulting friction between the outer surface of the dowel pin 130 and the adjacent surfaces of the camming portion 134 and the driveshaft 48 causes torque to be transmitted from the sprocket 102, and to the driveshaft 48 via the dowel pin 130.

FIG. 8 depicts torque being applied to the sprocket 102 by the chain 42 in the clockwise direction. As can be seen in FIG. 8, the clutch cage 106 is in its first position, so that each dowel pin 130 contacts the camming surface 134 located immediately counterclockwise of the dowel pin 130. The torque exerted on the sprocket 102 is driving the camming portion 134 against the dowel pin 130. The curved shape of the camming portion 134, in combination with the relatively small gap between the camming portion 134 and the adjacent surface of the driveshaft 48, cause the dowel pin 130 to become wedged between the camming portion 134 and the driveshaft 48. The resulting friction between the dowel pin 130 and the outer surface of the driveshaft 48 causes the driveshaft 48 to rotate in the clockwise direction with the dowel pin 130 and the sprocket 102. The torque thus imparted to the driveshaft 48 is transmitted to the wheels 20 connected to the ends of the driveshaft 48, causing the wheels 20 to rotate with the driveshaft 48 in the clockwise direction.

Referring still to FIG. 8, when the torque applied to the sprocket 102 by the chain 42 ceases, such as when the passenger stops pedaling, the sprocket 102 is able to free-wheel, or freely rotate, in relation to the driveshaft 48 in the counterclockwise direction. Conversely, the driveshaft 48 can continue to rotate in the clockwise direction after the sprocket 102 has ceased rotating, and as the momentum of the railbike 10 causes the wheels 20 and the attached driveshaft 48 to continue rotating in the clockwise direction. As can be seen in FIG. 8, the clutch cage 106 is being held in its first position by the counterclockwise bias of the spring 125, which in turn prevents the dowel pins 130, which are restrained within the recesses 131 in the cage 106, from moving in a clockwise direction, into contact with the camming portion 134 located immediately clockwise of each dowel pin 130. Because the sprocket 102 no longer is rotating in a manner that causes the dowel pins 130 to become firmly wedged between the camming portions 134 and driveshaft 48, the driveshaft 48 can rotate, or freewheel, in relation to the dowel pins 130 and the camming portions 134; and the dowel pins 130 do not transmit torque between the sprocket 102 and the driveshaft 48.

The railbike 10 can be driven in the reverse direction by moving the clutch cage 106 to its second position, shown in FIG. 9, and by reversing the orientations of the passenger seats 30 as discussed above. As can be seen in FIG. 9, moving the clutch cage 106 to the second position causes each dowel pin 130 to contact the camming surface 134 located immediately clockwise of the dowel pin 130. Each passenger then can pedal an associated pedal assembly 40 in a manner that causes the attached chain 42 to exert a counterclockwise torque on the sprocket 102 of the associated clutch 100. This torque drives the camming portion 134 against the dowel pin 130, causing the dowel pin 130 to become wedged between the camming portion 134 and the driveshaft 48. The resulting friction between the dowel pin 130 and the outer surface of the driveshaft 48 causes driveshaft 48 to rotate in the counterclockwise direction with the dowel pin 130 and the sprocket 102. The torque thus imparted to the driveshaft 48 is transmitted to the wheels 20 connected to the ends of the driveshaft 48, causing the wheels 20 to rotate with the driveshaft 48 in the counter-clockwise direction.

Referring still to FIG. 9, when the counterclockwise torque applied to the sprocket 102 by the chain 42 ceases, such as when the passenger stops pedaling, the sprocket 102 is able to freewheel, or freely rotate, in relation to the driveshaft 48 in the clockwise direction. Conversely, the driveshaft 48 can continue to rotate in the counterclockwise direction after the sprocket 102 has ceased rotating, and as the momentum of the railbike 10 causes the wheels 20 and the attached driveshaft 48 to continue rotating in the coun-terclockwise direction. As can be seen in FIG. 9, the cage 106 is being held in its second position by the clockwise bias of the spring 125, which in turn prevents the dowel pins 130, which are restrained within the recesses 131 in the cage 106, from moving in a counterclockwise direction, into contact with the camming portion 134 located immediately coun-terclockwise of each dowel pin 130. Because the sprocket 102 no longer is rotating in a manner that causes the dowel pins 130 to become firmly wedged between the camming portions 134 and driveshaft 48, the driveshaft 48 can rotate in relation to the dowel pins 130 and the camming portions 134. The dowel pins 130, therefore, do not transmit torque between the sprocket 102 and the driveshaft 48 under this condition.

Alternative embodiments of the railbike 10 can include clutches having configurations other than the above-described configuration of the clutch 100.

I claim:

1. A railbike configured for movement on a railway, the railbike comprising:
   a frame;
   a plurality of wheels coupled to the frame, the wheels being configured to rotate in relation to the frame, and to engage the railway;
   a driveshaft mounted on the frame and configured to rotate in relation to the frame, the driveshaft being connected to at least one of the wheels;
   a first and a second rail mounted on the frame;
   a seat mounted on the frame and configured to provide a seating area for a passenger, the seat configured to be mounted on the frame in a first orientation, and a second orientation angularly offset from the first orientation by about 180 degrees, the seat comprising:
      a first bracket configured to engage the first rail when the seat is in the first orientation and configured to engage the second rail when the seat is in the second orientation, and
      a second bracket configured to engage the second rail when the seat is in the first orientation and configured to engage the first rail when the seat is in the second orientation;
   a pedal assembly mounted on the frame, the pedal assembly being configured to rotate in relation to the frame, and to transmit a torque applied to the pedal assembly by the passenger; and
   a clutch coupled to the pedal assembly and configured to transmit to the driveshaft at least a portion of the torque applied to the pedal assembly, wherein the clutch is selectively configurable to transmit the portion of the applied torque to the driveshaft in a first angular direction, and in a second angular direction opposite the first angular direction.

2. The railbike of claim 1, wherein:
   the seat further comprises a platform, and a backrest connected to the bottom platform; and
   the brackets are mounted on a lower surface of the platform.

3. The railbike of claim 1, wherein:
   the seat is a first seat, and the railbike further comprises a second, a third, and a fourth seat;
   the pedal assembly is a first pedal assembly, and the railbike further comprises a second, a third, and a fourth pedal assembly; and
   the clutch is a first clutch, and the railbike further comprises a second, a third, and a fourth clutch.

4. The railbike of claim 1, wherein the pedal assembly comprises a sprocket, and two pedals connected to the sprocket.

5. The railbike of claim 4, further comprising a chain coupled to the sprocket and the clutch, the chain being configured to transmit the at least a portion of the applied torque to the clutch.

6. A railbike configured for movement on a railway, the railbike comprising:
   a frame;

a plurality of wheels coupled to the frame, the wheels being configured to rotate in relation to the frame, and to engage the railway;
   a driveshaft mounted on the frame and configured to rotate in relation to the frame, the driveshaft being connected to at least one of the wheels;
   a seat mounted on the frame and configured to provide a seating area for a passenger;
   a pedal assembly mounted on the frame, the pedal assembly being configured to rotate in relation to the frame, and to transmit a torque applied to the pedal assembly by the passenger; and
   a clutch configured to transmit to the driveshaft at least a portion of the torque applied to the pedal assembly, the clutch comprising a sprocket coupled to the pedal assembly, and at least one pin coupled to the pedal assembly;
      wherein the clutch is selectively configurable to transmit the portion of the applied torque to the driveshaft in a first angular direction, and in a second angular direction opposite the first angular direction, and
      wherein the pin is configured to engage an inner circumferential surface of the sprocket and an outer surface of the driveshaft so that the portion of the applied torque is transmitted from the sprocket and to the driveshaft via the pin.

7. The railbike of claim 6, wherein:
   the inner circumferential surface of the sprocket comprises a first camming portion; and
   the pin is configured to engage the first camming portion so that the at least a portion of the applied torque is transmitted from the first camming portion and to the driveshaft via the pin, in the first angular direction.

8. The railbike of claim 7, wherein:
   the inner circumferential surface of the sprocket further comprises a second camming portion; and
   the pin is further configured to engage the second camming portion so that the at least a portion of the applied torque is transmitted from the second camming portion and to the driveshaft via the pin, in the second angular direction.

9. The railbike of claim 8, wherein:
   the clutch further comprises a cage mounted on the driveshaft and configured to rotate in relation to the driveshaft; and
   the cage has at least one recess formed therein and configured to receive the pin.

10. The railbike of claim 9, wherein the cage is configured to move between a first position at which the pin contacts the first camming portion, and a second position at which the pin contacts the second camming portion.

11. The railbike of claim 10, wherein:
   the driveshaft is configured to rotate in the second angular direction in relation to the pin and the sprocket when the cage is in the first position; and
   the driveshaft is further configured to rotate in the first angular direction in relation to the pin and the sprocket when the cage is in the second position.

12. The railbike of claim 10, wherein:
   the clutch further comprises a spring disposed within a bore formed in the cage, and a set screw coupled to the hub and configured to retain the spring in the bore;
   the spring is configured to bias the cage toward the first position cage when the cage is in the first position; and
   the spring is further configured to bias the cage toward the second position when the cage is in the second position.

13. The railbike of claim 6, wherein the pin is further configured to transmit the portion of the applied torque from the sprocket and to the driveshaft via frictional contact between the pin, the sprocket, and the driveshaft.

14. The railbike of claim 7, wherein the first camming portion comprises a curved surface that extends radially inward, toward an axis of rotation of the driveshaft.

15. The railbike of claim 6, wherein:

the clutch further comprises a hub having a first half and a second half;

the sprocket is positioned between the first and second halves;

the hub and the sprocket define a cavity; and the cage and the pin are positioned within the cavity.

16. The railbike of claim 8, wherein:

the pin is a first pin, and the clutch further comprises a second, a third, a fourth, a fifth, and a sixth pin; and the inner circumferential surface of the sprocket further comprises a third, a fourth, a fifth, and a sixth camming portion.

\* \* \* \* \*